United States Patent [19]

Swanson

[11] 3,851,389

[45] Dec. 3, 1974

[54] MULTIPLE ADJUSTMENT SHEAR

[76] Inventor: Leopold G. Swanson, 2125 James St., Martinez, Calif. 94553

[22] Filed: Aug. 29, 1973

[21] Appl. No.: 392,768

[52] U.S. Cl. .................................................. 30/250
[51] Int. Cl. ............................................. B26b 13/26
[58] Field of Search ............ 30/249, 250, 251, 252, 30/254, 248, 190, 188

[56] References Cited
UNITED STATES PATENTS

| | | | |
|---|---|---|---|
| 993,646 | 5/1911 | Burkett | 30/250 |
| 1,820,169 | 8/1931 | Wigand | 30/251 X |
| 2,090,228 | 8/1937 | Porter | 30/252 |
| 2,604,695 | 7/1952 | McGary | 30/250 |

FOREIGN PATENTS OR APPLICATIONS

| | | | |
|---|---|---|---|
| 515,597 | 2/1955 | Italy | 30/254 |

*Primary Examiner*—Al Lawrence Smith
*Assistant Examiner*—J. C. Peters
*Attorney, Agent, or Firm*—Harris Zimmerman

[57] ABSTRACT

A hand-operated shear for metal or the like includes two opposed blades pivotally joined together at a first pivot point. One blade has a stem formed integrally therewith and extending longitudinally, with a fixed handle riveted thereto, and a lug projecting from the stem with a pivot aperture extending through the lug. Pivoted to the pivot aperture is a movable handle having a slot adjacent to the pivot point, the slot having detents formed therein. The other blade has a stem with a dog-leg configuration extending toward the lug, with a slot extending through the end of the stem. A pivot pin extends through the slot in the dog leg and through one of the detents in the slot in the handle, so that rotation of the handle acts through the pivot pin to rotate the opposed blades in a shearing action. The pivot pin may be placed in various detents in the lug slot, allowing the mechanical advantage of the shear to be selected appropriately for the material to be sheared.

10 Claims, 5 Drawing Figures

PATENTED DEC 3 1974 3,851,389
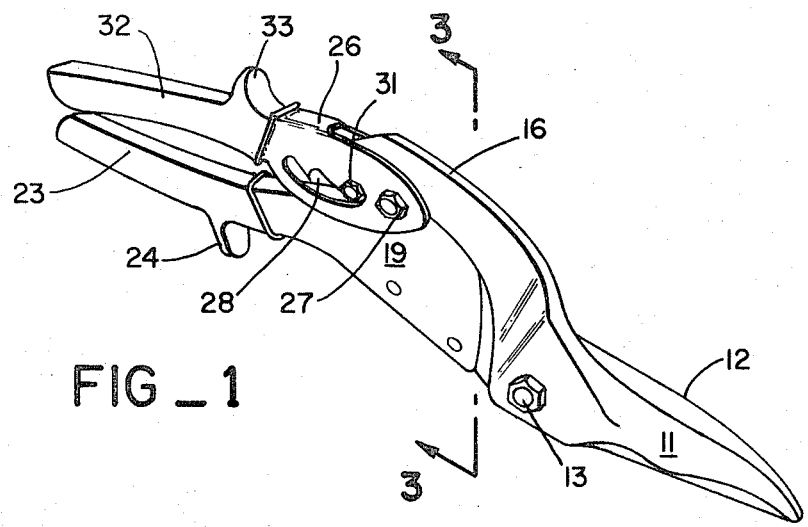
FIG_1
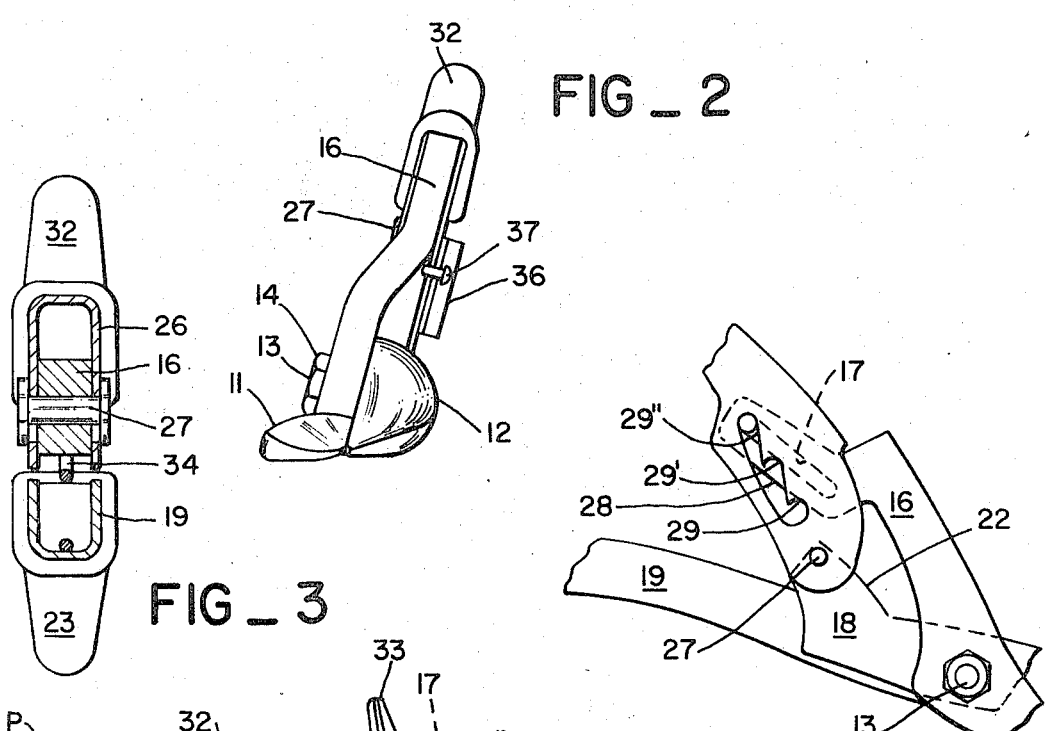
FIG_2
FIG_3
FIG_5
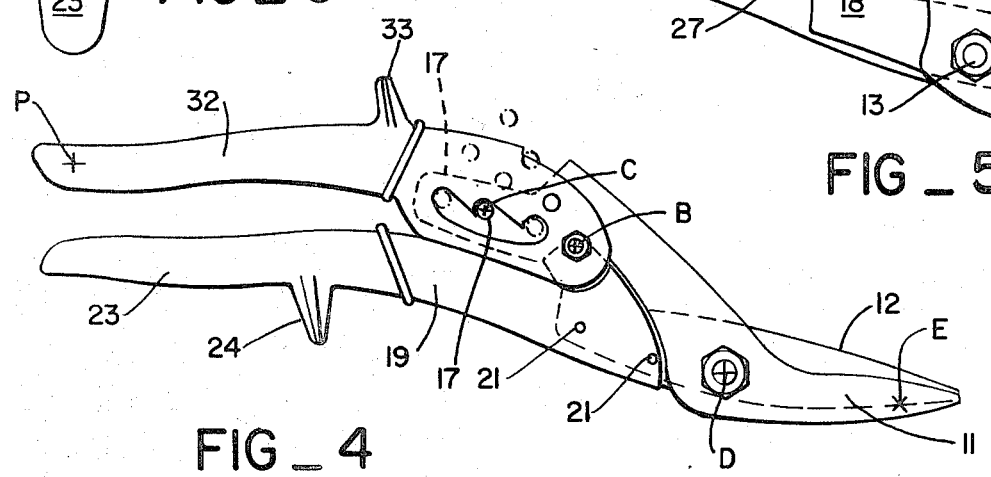
FIG_4

MULTIPLE ADJUSTMENT SHEAR

BACKGROUND OF THE INVENTION

Metal cutting snips or shears are among the most commonly used hand tools in industries where sheet metal is worked. With many types of snips known in the prior art, finger clearance is problematical, due to the fact that the rough, sharp edge of the cutting passes perilously close to the hand of the operator. From this situation arise a great many minor but troublesome injuries to the fingers of the operator.

In most sheet metal working situations, there is a great range of cutting effort required in the shearing of different thicknesses and compositions of sheet metals. If a worker is employing simple shears having long handles and a single pivot point, the range of cutting effort must be met by a plurality of shear tools, each tool designed for a specific cutting assignment. Even so, the shears intended for heavier or harder metals require an unacceptable amount of physical effort, and tend to be overly cumbersome. Another form of shear known in the prior art utilizes some form of compound leverage to achieve a powerful shear force from moderate physical effort applied to a relatively small tool. An inherent limitation of this type of tool construction is that the cutting stroke is foreshortened in proportion to the mechanical advantage of the tool. Thus, although this form of hand shear may be useful for cutting heavy materials, it lacks the versatility to accommodate a variety of materials, due to the fact that the shortened cutting stroke causes the cutting of light materials to be unnecessarily protracted. Clearly, the prior art reflects the lack of a hand shear which has both the mechanical advantage to cut hard or thick materials and a long cutting stroke to quickly cut light or thin materials.

SUMMARY OF THE INVENTION

The present invention encompasses a hand shear of the compound leverage type with a mechanical advantage that is adjustable to provide differing cutting force and stroke length. Thus the present invention may be readily adjusted to shear both heavy and light materials with the optimum manual effort and stroke length. The shear comprises two opposed blades pivotally secured together with a first pivot pin, one of the blades having a stem of dog leg configuration extending in the shear plane of the two blades. The other blade includes a stem extending substantially linearly from the blade, with a fixed handle riveted to the stem. Projecting from the stem in the shear plane and toward the dog leg is a lug, to which is pivoted a movable handle. The movable handle has a slot therethrough, with a plurality of detents formed in the side of the slot. The handle slot is registrable with a slot through the dog leg of the blade stem, with a bolt received through both of the slots and secured with a nut. The slots are not colinear, and the bolt, which is disposed in one of the detents in the handle slot, determines the axis of intersection of the slots. Manual rotation of the movable handle about its pivot toward the other handle imparts rotational motion through the bolt to the dog leg of the blade stem, causing the blades to pivot and shear. The placement of the bolt in the selected detent in the handle slot determines the proportionate mechanical advantage and stroke length of the handle rotation relative to the blade rotation, thus providing a simple, quick yet effective structure for selecting the cutting force and cutting stroke length appropriate for the material to be sheared. Also, by having the lower surfaces of the blades generally flat or straight, the blades will act as true shears and produce an extremely clean cut along the entire length of the cut.

THE DRAWING

FIG. 1 is a perspective view of the present invention;

FIG. 2 is a front elevation of the present invention;

FIG. 3 is a cross-sectional elevation taken along line 3—3 of FIG. 1;

FIG. 4 is a schematic side view of the present invention;

FIG. 5 is a detailed schematic of the adjustability feature of the present invention.

DESCRIPTION OF THE PREFERRED EMBODIMENT

The embodiment of the present invention depicted in the drawing includes two opposed shear blades 11 and 12, each with a hole therethrough for receiving pivot bolt 13 which is secured with a nut 14. The lower surface of blade 11 and the upper surface of blade 12 are concave surfaces extending toward the tips of the blades to provide effective shearing action. Blade 11 has an integral stem 16 which extends in dog leg configuration in the shear plane, the dog leg having a lateral slot 17 therethrough. Blade 12 includes an integral stem 18 which extends substantially linearly from the blade, with a lug 22 protruding from the stem 18 toward the dog leg stem 16 in the shear plane. A fixed handle 19 of channel cross-section extends substantially colinearly with stem 18 and is secured thereto with rivets 21, the stem being received within the channel cavity. A plastic grip 23 is secured about the handle 19, with a manual stop 24 to facilitate handling and prevent accidents.

A movable handle 26 fabricated of channel-type material receives within the channel cavity the lug 22, to which it is pivotally secured with bolt 27. The movable handle 26 includes a slot 28 extending through both sides of the channel material, with detents 29 formed in the side of the slot 28. Also received within the channel cavity of handle 26 is the dog leg stem 16, with the slots 28 and 17 intersecting all one adjustable pivot axis. Along the adjustable pivot axis a pivot bolt 31 is placed through the slot 28 and 17 and secured with a nut, and is retained by one of the detents 29. Secured about the handle 26 is a plastic grip 32 with a manual stop 33 extending therefrom. To maintain the handle 26 rotated away from the handle 19 and thus dispose the blade edges in non-engagement, a spring 34 secured in the channel cavity of handle 19 urges the handle 26 in that direction. To maintain the handles together and blade tips together for travelling and storage, a latch 36 pivotally secured to handle 19 selectively engages a screw 37 received in a threaded hole in stem 16.

It may be seen that in normal disposition, the latch is disengaged, the spring biasing the handles and therefore the blades in rotated-apart relationship. Manual rotation of the handle 26 toward the handle 19 results in a reduced path and increased force applied to pivot bolt 31, which in turn transmits the force to the stem 16 and causes the edge of blade 11 to rotate into engagement with the edge of blade 12, shearing any material placed between the blades. As depicted in phantom in FIG. 4, placement of the pivot bolt 31 in a detent 29' or 29'' will increase the distance traversed by the bolt 31 during rotation of the handle, increasing the cutting stroke of the blades while proportionately reducing the cutting force applied to the blades. Thus the cutting force and stroke of the shear of the present invention may be altered by selective placement of the bolt 31 in the appropriate detent 29, to adjust the mechanical advantage to suit the material to be sheared.

Assuming that the center of manual force applied to handle 26 is at point P, as shown in FIG. 4, and knowing the cutting force F is applied at the intersection E of the blade edges, the force cutting force C equals $F \times \overline{PB}/\overline{CB} \times \overline{CD}/\overline{DE}$. It may be seen that as CB is much smaller than CD, movement of point C toward point B will increase the ratio $\overline{PB}/\overline{CB}$ more rapidly than it will decrease the ratio $\overline{CD}/\overline{DE}$. Thus the cutting force advantage may be increased by selecting a detent closer to the bolt 27. Although the embodiment depicted has three detents, it may be appreciated that the scope of the present invention encompasses providing as many detents as are required to cover the spectrum of cutting force required.

As shown in FIG. 2, the lower edges of the blades lie in a plane which is oblique to the shear plane and thus to the handles. This blade configuration permits the tool to be rested on a flat lateral surface while being used, easing the effort required, the cant of the handles ensuring that the hand of the operator is removed from the edge of the sheared material. Furthermore, the concave blade surfaces are designed to curl the sheared tailing up and away from the canted handles, providing a further measure of safety. The combination of the canted handles, the flat bottom blade surfaces, and the concave blade surfaces also facilitates the cutting of straight or smooth curves.

I claim:

1. A hand operated shear including first and second opposed blades pivotally joined together at a first pivot, each of said blades having first and second blade stems, respectively,
    a moveable handle pivotally secured to said first stem at a second pivot, said movable handle including a first slot having a plurality of detents therein, and said second blade stem including a second slot therein, and a pin releasably extending through both of said slots and retained in one of said detents.

2. The hand-operated shear of claim 1, wherein said detents comprise a plurality of recesses formed in an edge of said first slot.

3. The hand-operated shear of claim 2, said first stem including a lug extending therefrom and toward said second stem, said second pivot extending through said lug.

4. The hand-operated shear of claim 1, wherein the bottom surfaces of said blades are substantially coplanar.

5. The hand-operated shear of claim 4, wherein said handles extend coplanarly in a plane oblique to the plane of the bottom surfaces of said blades.

6. The hand-operated shear of claim 1, wherein said second pivot is disposed intermediate of said first pivot and said pin, and said detents are disposed colinearly with said second pivot.

7. The hand-operated shear of claim 1, wherein each of said blades includes a concave surface extending adjacent to the cutting edge, each concave surface opposed to the other.

8. The hand-operated shear of claim 1, wherein said movable handle includes a channel portion having spaced side walls receiving therebetween portions of said first blade stem and said second blade stem.

9. A hand-operated shear including first and second opposed blades pivotally joined together at a first pivot, each of said blades having first and second blade stems, respectively,
    a movable handle pivotally secured to said first stem at a second pivot, said movable handle including a plurality of detents, and further including a channel portion having spaced sides receiving therebetween portions of said first blade stem and said second blade stem, and
    linking means secured to said second blade stem and retained by one of said plurality of detents to transmit rotational motion from said movable handle to said second blade.

10. The hand-operated shear of claim 9, wherein said first stem includes a lug extending therefrom toward said second stem and between said spaced sides, and said second pivot extends through said lug.

* * * * *